(12) United States Patent
Lee (10) Patent No.: US 11,378,996 B2
(45) Date of Patent: Jul. 5, 2022

(54) OPERATING DEVICE

(71) Applicant: KORTEK CORPORATION, Incheon (KR)

(72) Inventor: Kyoung Chan Lee, Seoul (KR)

(73) Assignee: KORTEK CORPORATION, Incheon (KR)

( * ) Notice: Subject to any disclaimer, the term of this patent is extended or adjusted under 35 U.S.C. 154(b) by 0 days.

(21) Appl. No.: 17/431,744

(22) PCT Filed: Feb. 17, 2020

(86) PCT No.: PCT/KR2020/002220
§ 371 (c)(1),
(2) Date: Aug. 18, 2021

(87) PCT Pub. No.: WO2020/171501
PCT Pub. Date: Aug. 27, 2020

(65) Prior Publication Data
US 2022/0121236 A1   Apr. 21, 2022

(30) Foreign Application Priority Data

Feb. 22, 2019   (KR) .................. 10-2019-0021102
Aug. 5, 2019    (KR) .................. 10-2019-0094758

(51) Int. Cl.
*G05G 1/02*   (2006.01)
*G05G 5/06*   (2006.01)
(Continued)

(52) U.S. Cl.
CPC .............. *G05G 5/06* (2013.01); *G05G 1/10* (2013.01); *G07F 17/3209* (2013.01)

(58) Field of Classification Search
CPC .. G05G 1/02; G05G 1/08; G05G 1/10; H01H 9/20; F16H 61/22
See application file for complete search history.

(56) References Cited

U.S. PATENT DOCUMENTS

2015/0167827 A1*  6/2015  Fett ..................... F16H 59/02
                                                    74/473.3
2017/0175884 A1*  6/2017  Watanabe ............... F16H 59/08
(Continued)

FOREIGN PATENT DOCUMENTS

JP       2001-283674 A      10/2001
KR   10-2005-0010308 A       1/2005
(Continued)

OTHER PUBLICATIONS

PCT International Search Report for PCT Application No. PCT/KR2020/002220, dated Jul. 9, 2020.

*Primary Examiner* — Richard W Ridley
*Assistant Examiner* — Brian J McGovern
(74) *Attorney, Agent, or Firm* — Schmeiser, Olsen & Watts, LLP (57) ABSTRACT

Provided is an operating device including an operation part inserted in an insertion hole part of a glass part; a frame part installed in a position facing the operation part while having the glass part interposed between same and the operation part; a lock part rotatably installed on the frame part and restricting the movement of the operation part by rotating; and a transfer gear part engaged with a gear provided on the lock part and rotating the lock part by moving or rotating by an external force.

9 Claims, 10 Drawing Sheets

(51) Int. Cl.
*G05G 1/10* (2006.01)
*G07F 17/32* (2006.01)

(56) References Cited

U.S. PATENT DOCUMENTS

| | | | | |
|---|---|---|---|---|
| 2018/0320780 A1* | 11/2018 | Heo | ........................ | F16H 59/02 |
| 2018/0363774 A1* | 12/2018 | Yamamoto | .............. | F16H 59/08 |
| 2019/0211921 A1* | 7/2019 | Watanabe | ................ | F16H 61/22 |
| 2020/0063857 A1* | 2/2020 | Kim | ........................ | G05G 1/10 |
| 2020/0182349 A1* | 6/2020 | Asahina | .................. | F16H 59/08 |
| 2021/0079998 A1* | 3/2021 | Nakanishi | ............... | F16H 61/16 |
| 2021/0247796 A1* | 8/2021 | Provini | .................... | G05G 5/05 |

FOREIGN PATENT DOCUMENTS

| | | |
|---|---|---|
| KR | 20-0434973 | 1/2007 |
| KR | 10-1670323 B1 | 10/2016 |
| KR | 20-2017-0000821 U | 3/2017 |
| KR | 10-1919603 B2 | 11/2018 |

* cited by examiner

OPERATING DEVICE

CROSS-REFERENCE TO RELATED APPLICATIONS

This application claims priority to PCT Application No. PCT/KR2020/002220, having a filing date of 17 Feb. 2020, based on KR 10-2019-0094758, having a filing date of 5 Aug. 2019, and KR 10-2019-0021102, having a filing date of 22 Feb. 2019, the entire contents all of which are hereby incorporated by reference.

FIELD OF TECHNOLOGY

The following relates to an operating device, and more particularly, to an operating device that allows an operation part to be quickly and easily installed and disassembled.

BACKGROUND

In general, display units are installed in game devices, and operation parts are fixed to the display units. Push operation parts are connected to circuit boards by electrical wires, and as signals of the push operation parts are input to the circuit boards, specific functions are selected. Such push operation parts may fail due to impacts or the like.

However, in the conventional art, since the push operation part is fixed to the display unit, when repair is required due to a failure of the push operation part, operations of separating the entire display unit from the game device and then transporting the display unit to a repair company are required.

At the repair company, the operation part is repaired or replaced and then moves to a customer, and the display unit is reinstalled in the game device. Thus, maintenance costs and working time increase. Therefore, it is required to improve this problem.

The background technology is disclosed in Korean Utility Model No. 20-0434973 (registered on Dec. 26, 2006, titled: Unmanned operating device of operation button of game console).

SUMMARY

An aspect relates to an operating device that allows an operation part to be quickly and easily installed and disassembled, and thus maintenance costs can be reduced.

An aspect of embodiments of the present invention provides an operating device including an operation part inserted into an insertion hole part of a glass part, a frame part installed at a position facing the operation part with the glass part interposed therebetween, a locking part that is rotatably installed in the frame part and restrains movement of the operation part by rotation, and a transmission gear part that is engaged with a gear provided in the locking part and rotates the locking part by being moved or rotated by an external force.

The frame part may include a base member having a plate shape, located below the glass part, and having an inner hole part at a position facing the insertion hole part, and a guide part protruding from the base member and installed in a shape surrounding an outer side of the locking part.

The locking part may be located on each of two sides of the transmission gear part and may rotate toward the operation part or rotate in a direction away from the operation part by linear movement of the transmission gear part.

The locking part may include a first rotation gear part that is engaged with a gear of the transmission gear part, is rotatably installed in the frame part, and is rotated by the movement of the transmission gear part, a first extension member that extends from the first rotation gear part and is installed in a shape surrounding a side surface of the operation part, and a first restraint part that protrudes from the first extension member and is caught by a restraint groove part provided in the side surface of the operation part.

The first rotation gear part may include a rotation gear body rotatably installed in the frame part, and an outer gear that forms a gear outside the rotation gear body and is engaged with the transmission gear part.

The transmission gear part may include a first transmission gear body that is installed to be linearly movable along the frame part and is installed at a position facing the locking part, and a spur gear portion that forms gears engaged with the locking part on both sides of the first transmission gear body.

The transmission gear part may include a second transmission gear body that is rotatably installed above the frame part and has one side installed at a position facing the locking part, and a drive gear part that forms a helical gear engaged with the locking part outside the second transmission gear body.

The locking part may be located on each of two sides of the drive gear part and may rotate toward the operation part or rotate in a direction away from the operation part by rotation of the second transmission gear body.

The locking part may include a second rotation gear part that is engaged with the drive gear part, is rotatably installed in the frame part, and is rotated together with the drive gear part, a second extension member that extends from the second rotation gear part and is installed in a shape surrounding a side surface of the operation part, and a second restraint part that protrudes from the second extension member and is caught by a restraint groove part provided in the side surface of the operation part.

In an operating device according to embodiments of the present invention, a locking part is rotated by rotation or movement of a transmission gear part to restrain movement of an operation part or easily release the restraint of the operation part, and thus maintenance costs can be reduced, and work time can also be shortened.

Further, according to embodiments of the present invention, since only the operation part may be repaired or replaced in a state of being separated from a glass part, an operation of moving the glass part together with the operation part is omitted, and thus maintenance costs and work time for the operation part can be reduced.

BRIEF DESCRIPTION

Some of the embodiments will be described in detail, with reference to the following figures, wherein like designations denote like members, wherein.

DETAILED DESCRIPTION

Hereinafter, an operating device according to a first embodiment of the present invention will be described with reference to the accompanying drawings. In this process, the thickness of lines or the size of components illustrated in the drawings may be exaggerated for clarity and convenience of description.

Further, terms described below are defined in consideration of functions in embodiments of the present invention and may change according to the intention or custom of a user or an operator. Therefore, definitions of these terms should be made based on the contents throughout the present specification.

Figure 1:
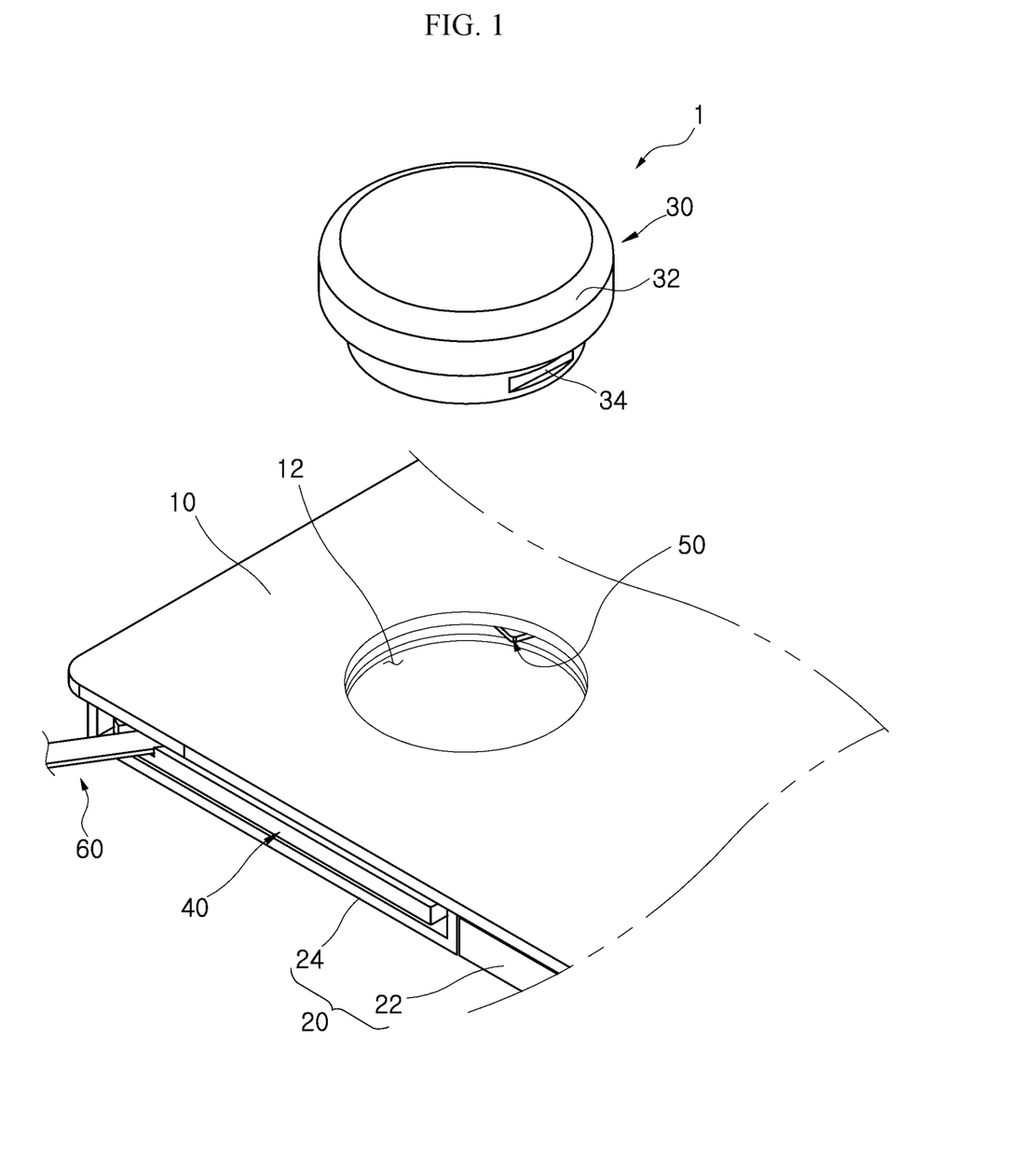
FIG. 1 is a perspective view illustrating a state in which an operation part is separated in an operating device according to a first embodiment of the present invention.
Figure 2:
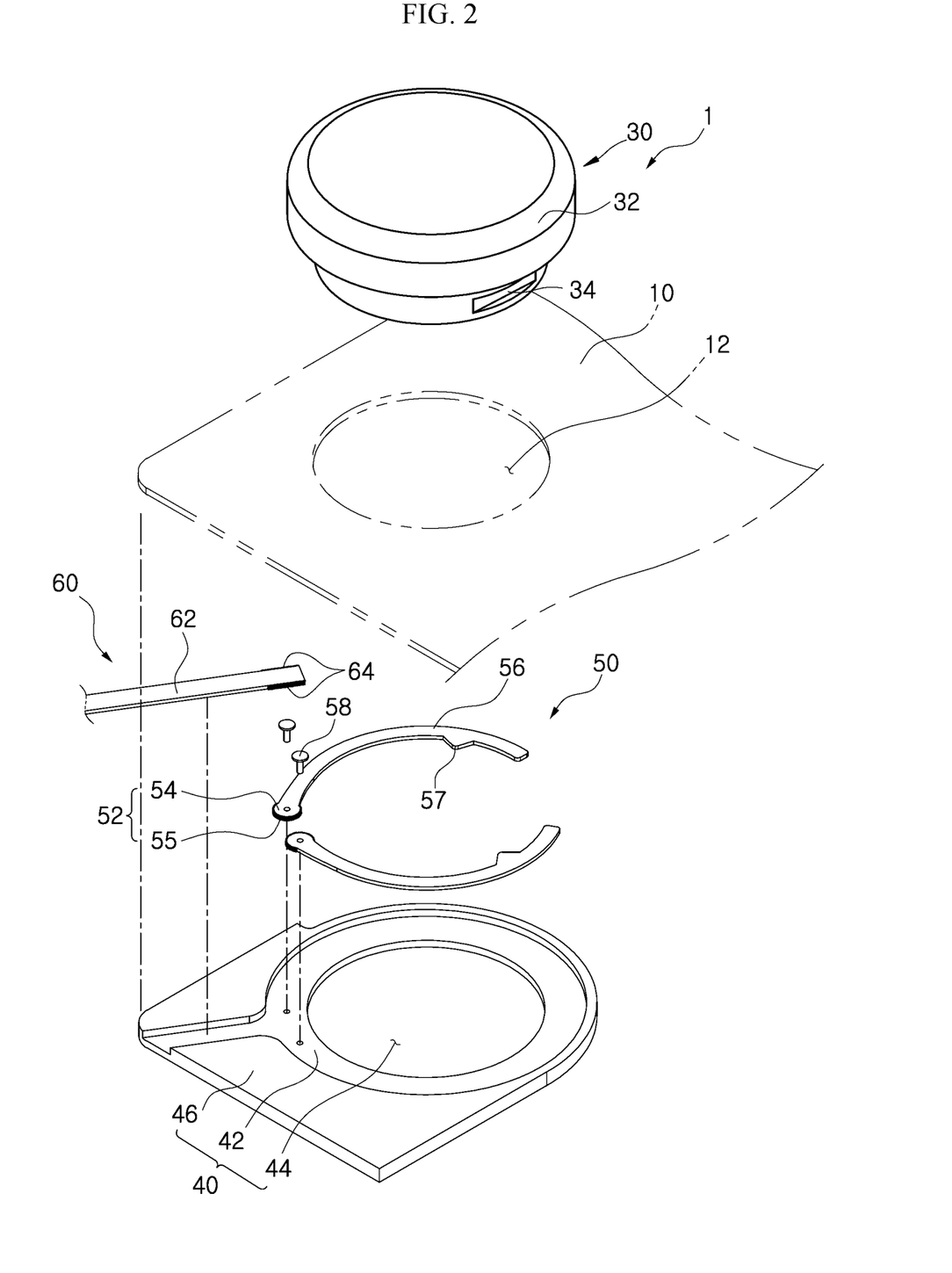
FIG. 2 is an exploded perspective view of the operating device according to the first embodiment of the present disclosure.
Figure 3:
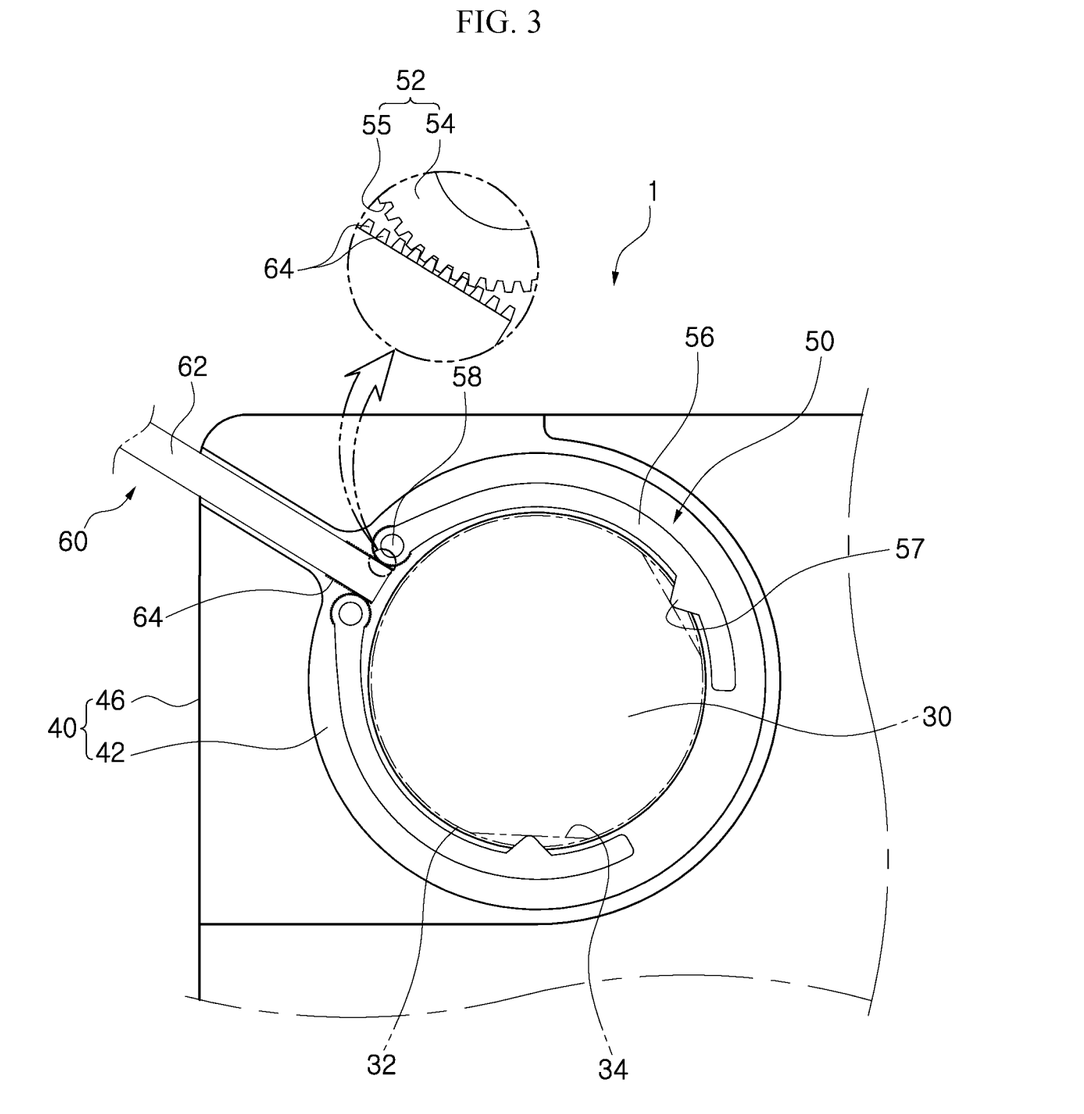
FIG. 3 is a plan view of the operating device according to the first embodiment of the present disclosure.
Figure 4:
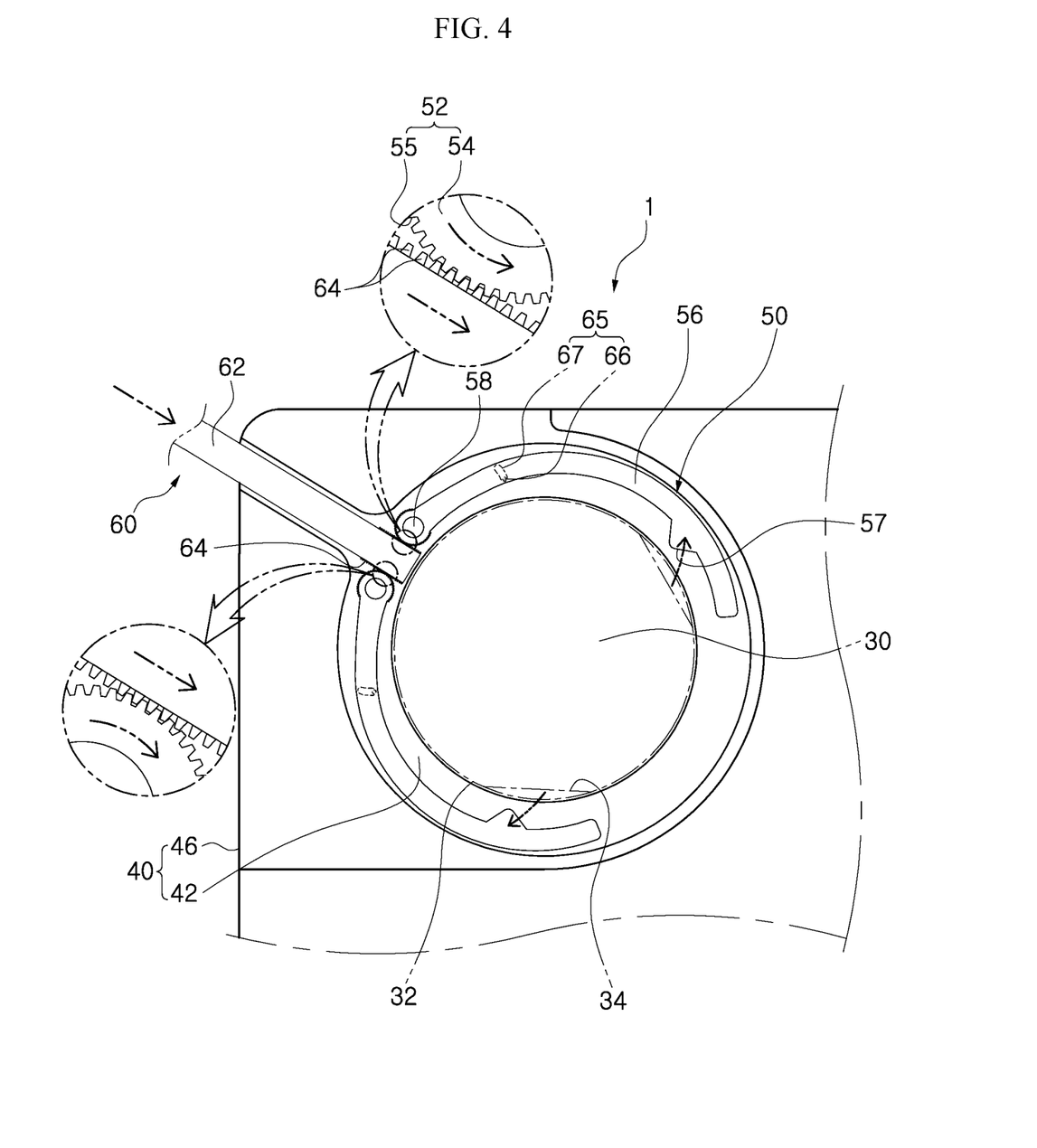
FIG. 4 is a view illustrating a state in which a locking part is rotated and the operation part is unlocked according to the first embodiment of the present invention.
Figure 5:
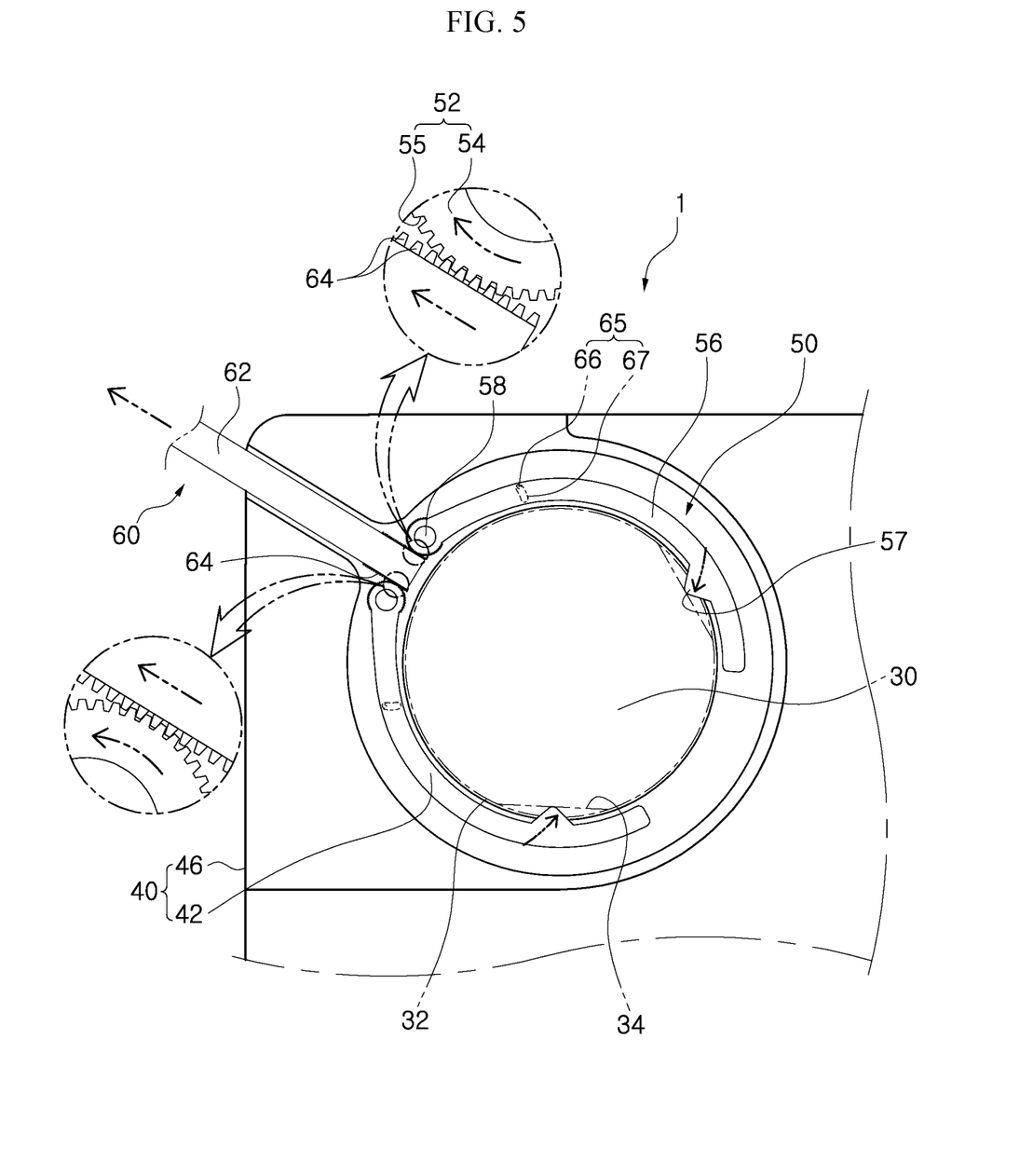
FIG. 5 is a view illustrating a state in which the locking part is rotated to restrict movement of the operation part according to the first embodiment of the present invention.

FIG. 1 is a perspective view illustrating a state in which an operation part is separated in an operating device according to the first embodiment of the present invention, FIG. 2 is an exploded perspective view of the operating device according to the first embodiment of the present disclosure, FIG. 3 is a plan view of the operating device according to the first embodiment of the present disclosure, FIG. 4 is a view illustrating a state in which a locking part is rotated and the operation part is unlocked according to the first embodiment of the present invention, and FIG. 5 is a view illustrating a state in which the locking part is rotated to restrict movement of the operation part according to the first embodiment of the present invention.

As illustrated in FIGS. 1 to 3, an operating device 1 according to the embodiment of the present invention includes an operation part 30 inserted into an insertion hole part 12 of a glass part 10, a frame part 40 installed at a position facing the operation part 30 with the glass part 10 interposed therebetween, a locking part 50 that is rotatably installed in the frame part 40 and restricts movement of the operation part 30, and a transmission gear part 60 which is engaged with a gear provided in the locking part 50 and is moved or rotated by an external force to rotate the locking part 50.

As an embodiment, the operating device 1 may be applied to a button device used in a casino machine or the like.

A display unit 20 includes a display panel 22 that outputs an image and a mounting housing part 24 forming a space, in which the frame part 40 is installed, on one side of the display panel 22. The plate-shaped glass part 10 is disposed in front of the display unit 20 and the mounting housing part 24.

The glass part 10 is installed in a state of being spaced apart from the display unit 20 to secure visibility. Further, the insertion hole part 12 is formed in the glass part 10 so that the operation part 30 is inserted thereinto. Since the insertion hole part 12 is formed in the same shape as the circumference of the operation part 30, rotation is restricted while a body of the operation part 30 is inserted into the insertion hole part 12.

The operation part 30 is installed in the insertion hole part 12 of the glass part 10 installed in front of the display unit 20. Further, a stepped portion may be additionally formed at the circumference of the operation part 30 to limit the depth of insertion into the insertion hole part 12.

The operation part 30 is connected to a control unit by an electrical wire to transmit an operation signal, and the operation part 30 and the insertion hole part 12 are formed in a circular shape and may also be formed in a polygonal shape including a quadrangle or a triangle. The operation part 30 according to the first embodiment is formed in a circular shape and vertically extends. Meanwhile, protrusions 32 are formed at intervals of 120° along the circumference of the operation part 30.

The operation part 30 may be a button that has a circular cross section and vertically extends and may have a cross section having a polygonal shape including a quadrangle or the shape of the operation part 30 may be changed to various shapes such as an ellipse and a triangle.

Further, restraint groove parts 34, which first restraint parts 57 of the locking part 50 are inserted into and caught by, are formed in the circumference of the operation part 30. The restraint groove parts 34 according to the first embodiment are formed below the protrusions 32 facing the first restraint parts 57.

Therefore, when the locking part 50 is inserted into and caught by the restraint groove parts 34, the operation part 30 does not escape from the insertion hole part 12 of the glass part 10.

The frame part 40 may be changed into various shapes within the technical spirit of being installed at a position facing the operation part 30 with the glass part 10 interposed therebetween. The frame part 40 according to the first embodiment includes a plate-shaped base member 42 located below the glass part 10 and having an inner hole part 44 at a position facing the insertion hole part 12, and a guide portion 46 protruding from the base member 42 and installed in a shape surrounding the outer side of the locking part 50.

In the base member 42 installed in a plate shape below the glass part 10, the inner hole part 44 is formed at a position facing the insertion hole part 12. The inner hole part 44 forms a space into which a lower side of the operation part 30 is to be inserted.

The guide portion 46 surrounds the inner hole part 44, the locking part 50, and the transmission gear part 60 and protrudes upward from the base member 42. Thus, a groove part for guiding the operations of the transmission gear part 60 and the locking part 50 to be performed stably is formed.

The locking part 50 may be variously changed within the technical spirit of being rotatably installed in the frame part 40 and restraining the movement of the operation part 30 by rotation. The locking part 50 according to the first embodiment includes a first rotation gear part 52, a first extension member 56, the first restraint parts 57, and a first hinge pin 58.

The first rotation gear part 52 is engaged with a gear of the transmission gear part 60, is rotatably installed in the frame part 40, and is rotated by the movement of the transmission gear part 60. The first rotation gear part 52 according to the embodiment includes a rotation gear body 54 rotatably installed in the frame part 40 and an outer gear 55 that forms a gear outside the rotation gear body 54 and is engaged with the transmission gear part 60.

Since the first hinge pin 58 is installed in the frame part 40 to pass through the rotation gear body 54, the rotation gear body 54 may rotate about the first hinge pin 58. The outer gear 55 vertically forms the gear along the circumference of the rotation gear body 54.

The first extension member 56 extends from the first rotation gear part 52 and is installed in a shape surrounding the side surfaces of the operation part 30. Further, the first restraint parts 57 protrude from the first extension member 56 to form protrusions that are caught by the restraint groove parts 34 provided in the side surfaces of the operation part 30.

The locking parts 50 having the above configuration are located on both sides of the transmission gear part 60 and rotate toward the operation part 30 or rotate in a direction away from the operation part 30 by the linear movement of the transmission gear part 60.

The transmission gear part 60 may be formed in various shapes within the technical spirit of being engaged with gears provided in the locking part 50 and rotating the locking part 50 by being moved or rotated by an external force. The transmission gear part 60 according to the embodiment includes a first transmission gear body 62 and a spur gear portion 64.

The first transmission gear body 62 is installed to be linearly movable along the frame part 40 and has a rod shape installed at a position facing the locking part 50. The first transmission gear body 62 may be variously implemented by being moved in a linear direction while being held by an operator and being automatically moved by a linear drive device such as a cylinder as needed.

The spur gear portion 64 forms a gear engaged with the locking part 50 on both sides of the first transmission gear body 62. The spur gear portion 64 according to the first embodiment has a rack gear shape.

The operating device 1 according to the first embodiment may further include a guide part 65 that guides movement of the locking part 50 as illustrated in FIGS. 4 and 5. The guide part 65 according to the first embodiment includes a guide hole part 66 that forms an elongated groove inside the first extension member 56 and a protrusion-shaped guide protrusion 67 that protrudes from the frame part 40 and is inserted into the guide hole part 66.

When the locking part 50 is rotated by the movement of the transmission gear part 60, the guide protrusion 67 is inserted into the guide hole part 66, and thus the rotation of the locking part 50 may be stably guided.

Hereinafter, an operation state of the operating device 1 according to the first embodiment of the present invention will be described in detail with reference to the accompanying drawings.

As illustrated in FIG. 4, when the transmission gear part 60 is moved in a direction toward the operation part 30, the first rotation gear part 52 engaged with the spur gear portion 64 of the transmission gear part 60 is rotated. By the rotation of the first rotation gear part 52, the first extension member 56 rotates in a direction away from the operation part 30.

Accordingly, since the first restraint parts 57 formed integrally with the first extension member 56 are spaced apart from the restraint groove parts 34 of the operation part 30, the operation part 30 is unlocked. Thus, the operator removes the operation part 30 from the glass part 10 and then may perform maintenance work.

As illustrated in FIG. 5, after the completely repaired operation part 30 is located inside the locking part 50, the transmission gear part 60 moves in a direction away from the operation part 30. Since the first rotation gear part 52 engaged with the spur gear portion 64 of the transmission gear part 60 rotates, the first extension member 56 rotates in a direction toward the operation part 30.

Accordingly, since the first restraint parts 57 formed integrally with the first extension member 56 are inserted into and caught by the restraint groove parts 34 of the operation part 30, the operation part 30 is locked and the movement is restricted.

Hereinafter, an operating device 2 according to a second embodiment of the present invention will be described with reference to the accompanying drawings.

For convenience of description, components having the same configuration and operation as those of the first embodiment of the present invention are referred to by the same reference numerals, and detailed description thereof will be omitted.

Figure 6:
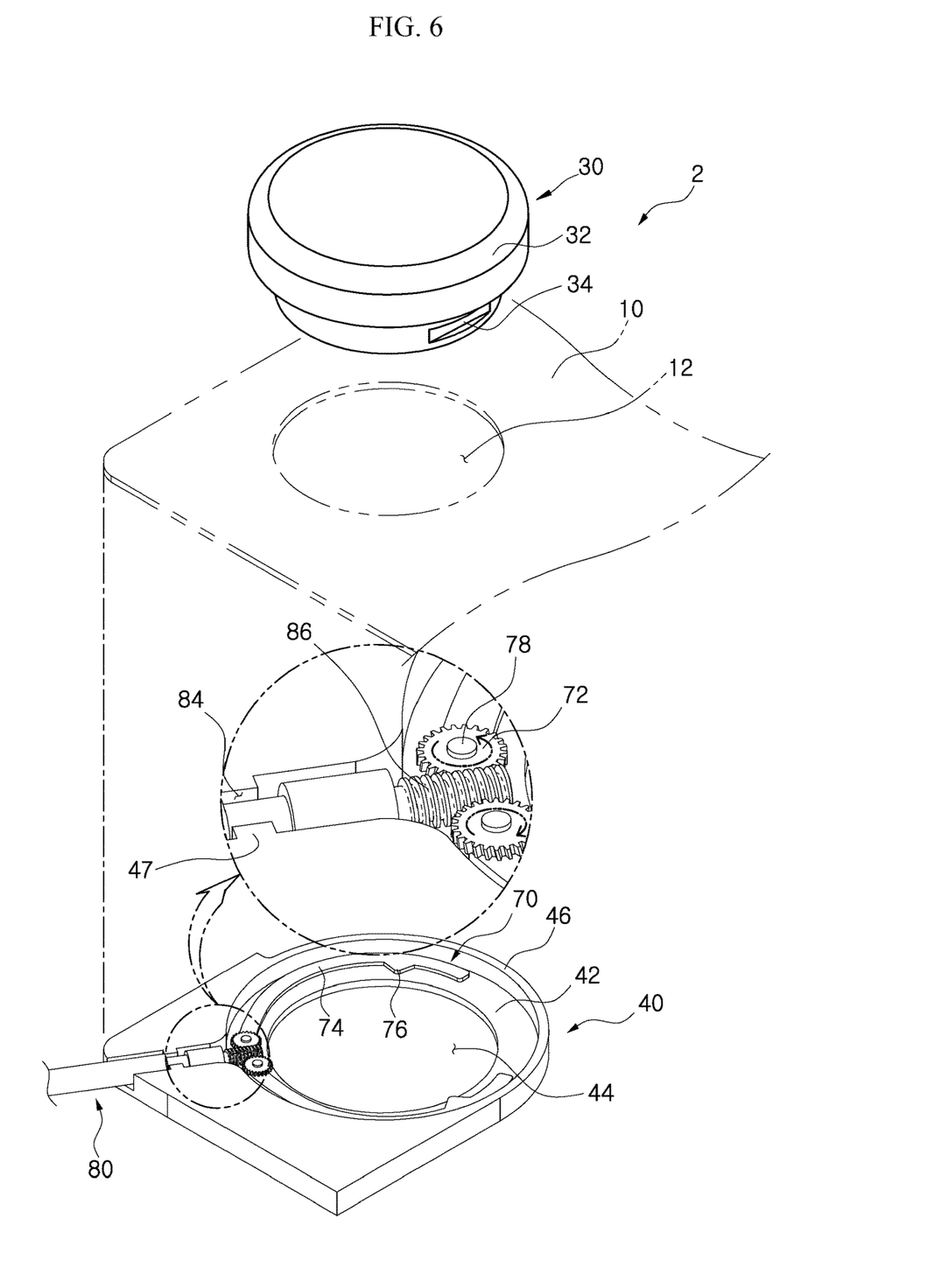
FIG. 6 is an exploded perspective view of an operating device according to a second embodiment of the present disclosure.
Figure 7:
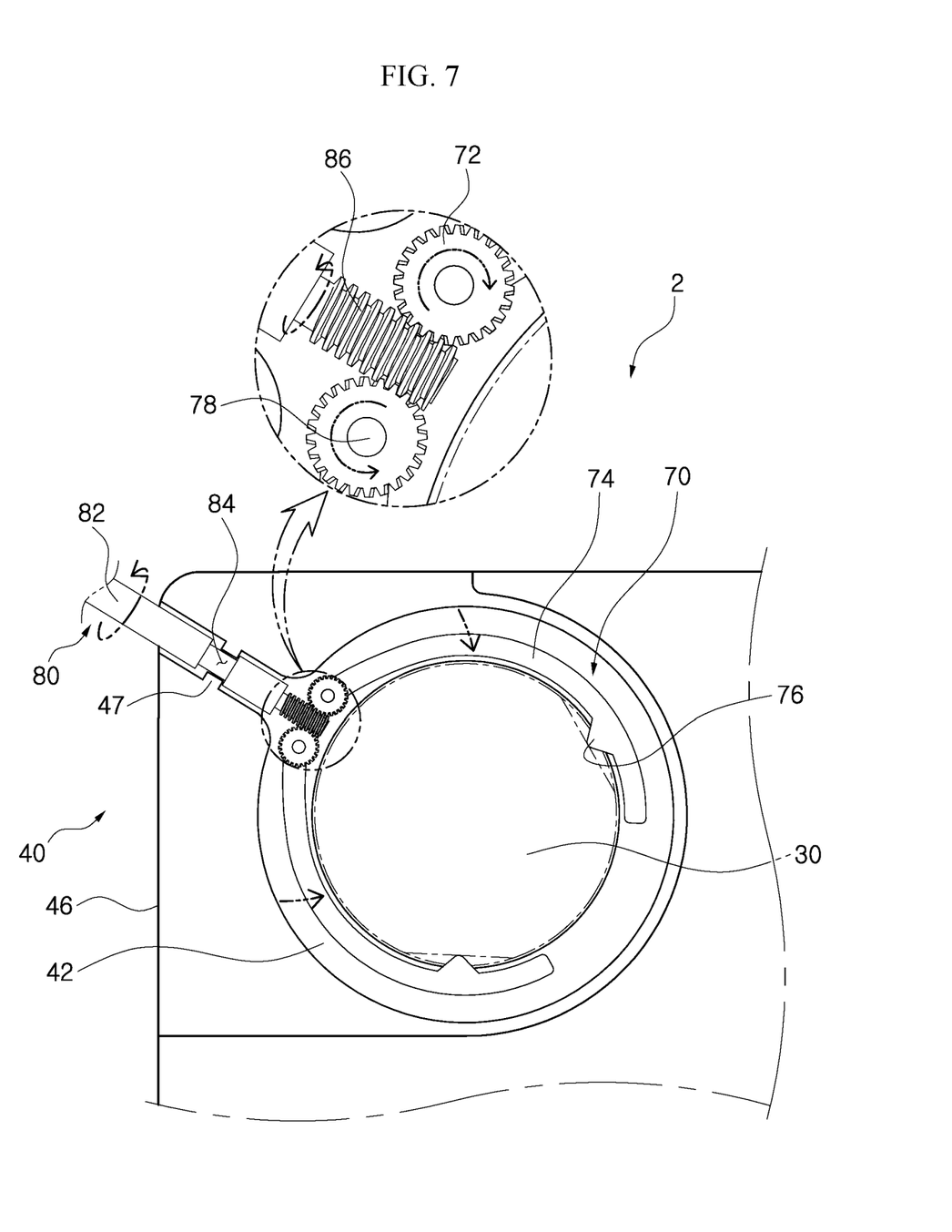
FIG. 7 is a view illustrating a state in which a locking part restricts movement of an operation part according to the second embodiment of the present invention.
Figure 8:
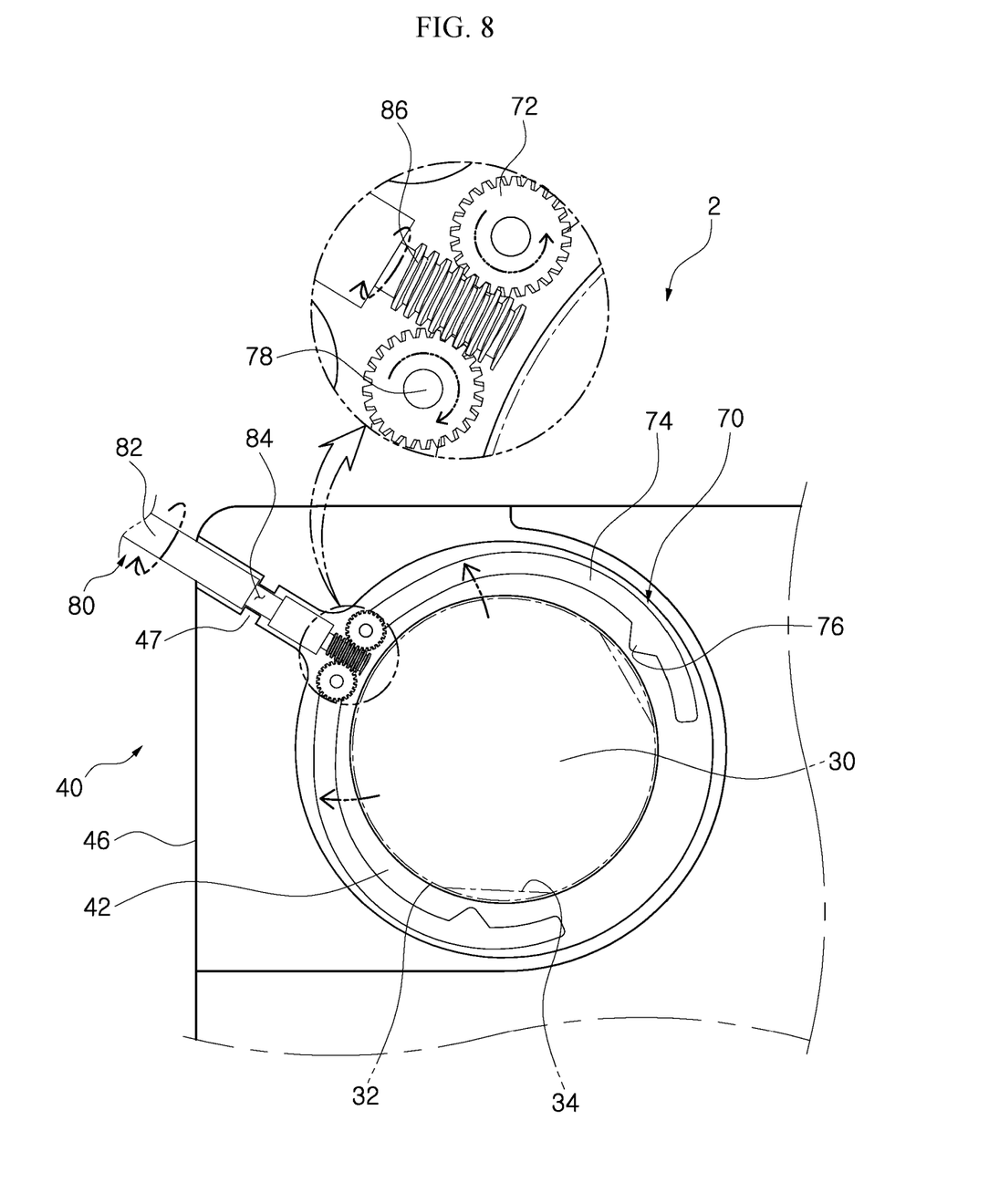
FIG. 8 is a view illustrating a state in which the locking part is rotated and the operation part is unlocked according to the second embodiment of the present invention.

FIG. 6 is an exploded perspective view of an operating device according to the second embodiment of the present disclosure, FIG. 7 is a view illustrating a state in which a locking part restricts movement of an operation part according to the second embodiment of the present invention, and FIG. 8 is a view illustrating a state in which the locking part is rotated and the operation part is unlocked according to the second embodiment of the present invention.

As illustrated in FIGS. 6 to 8, the operating device 2 according to the second embodiment of the present invention includes a transmission gear part 80 that rotates and a locking part 70 that is rotated by receiving the rotational power of the transmission gear part 80.

The transmission gear part 80 according to the second embodiment of the present invention includes a second transmission gear body 82 that is rotatably installed on the upper side of the frame part 40 and has one side installed at a position facing the locking part 70 and a drive gear part 86 forming a helical gear engaged with the locking part outside the second transmission gear body 82.

The second transmission gear body 82 has a rod shape and is rotatably installed in the frame part 40. The second transmission gear body 82 is provided with a side groove part 84 along the outer circumference thereof, and a side protrusion 47 protruding from the frame part 40 is inserted into the side groove part 84. Thus, rotation of the second transmission gear body 82 located above the frame part 40 is allowed and linear movement thereof is restricted.

The locking part 70 may be changed in various shapes within the technical spirit of being located on both sides of the drive gear part 86 and rotating in a direction toward the operation part 30 or rotating in a direction away from the operation part 30 by the rotation of the second transmission gear body 82.

The locking part 70 according to the second embodiment of the present invention includes a second rotation gear part 72 that is engaged with the drive gear part 86, is rotatably installed in the frame part 40, and is rotated together with the drive gear part 86, a second extension member 74 that extends from the second rotation gear part 72 and is installed in a shape surrounding the side surface of the operation part 30, and a second restraint part 76 that protrudes from the second extension member 74 and is caught by the restraint groove parts 34 provided in the side surfaces of the operation part 30.

Since a second hinge pin 78 passes through the second rotation gear part 72 and is then connected to the frame part 40, the second rotation gear part 72 rotates about the second hinge pin 78.

Gears of the second rotation gear part 72 located on both sides of the drive gear part 86 are installed to be inclined in directions opposite to each other. Thus, when the drive gear part 86 rotates, the second rotation gear parts 72 located on both sides of the drive gear part 86 rotate in different directions.

In the operating device 2 according to the second embodiment of the present invention, when the locking part 70 is moved in a direction toward the operation part 30 according to the rotational direction of the transmission gear part 80, the second restraint part 76 is inserted into the restraint groove parts 34 of the operation part 30, and thus the movement of the operation part 30 can be restricted.

Alternatively, when the locking part 70 is moved in a direction away from the operation part 30, the restraint groove parts 34 of the operation part 30 and the second restraint part 76 are spaced apart from each other, and thus the restriction of the operation part 30 is released.

Hereinafter, an operating device 3 according to a third embodiment of the present invention will be described with reference to the accompanying drawings.

For convenience of description, components having the same configuration and operation as those of the second embodiment of the present invention are referred to by the same reference numerals, and detailed description thereof will be omitted.

Figure 9:
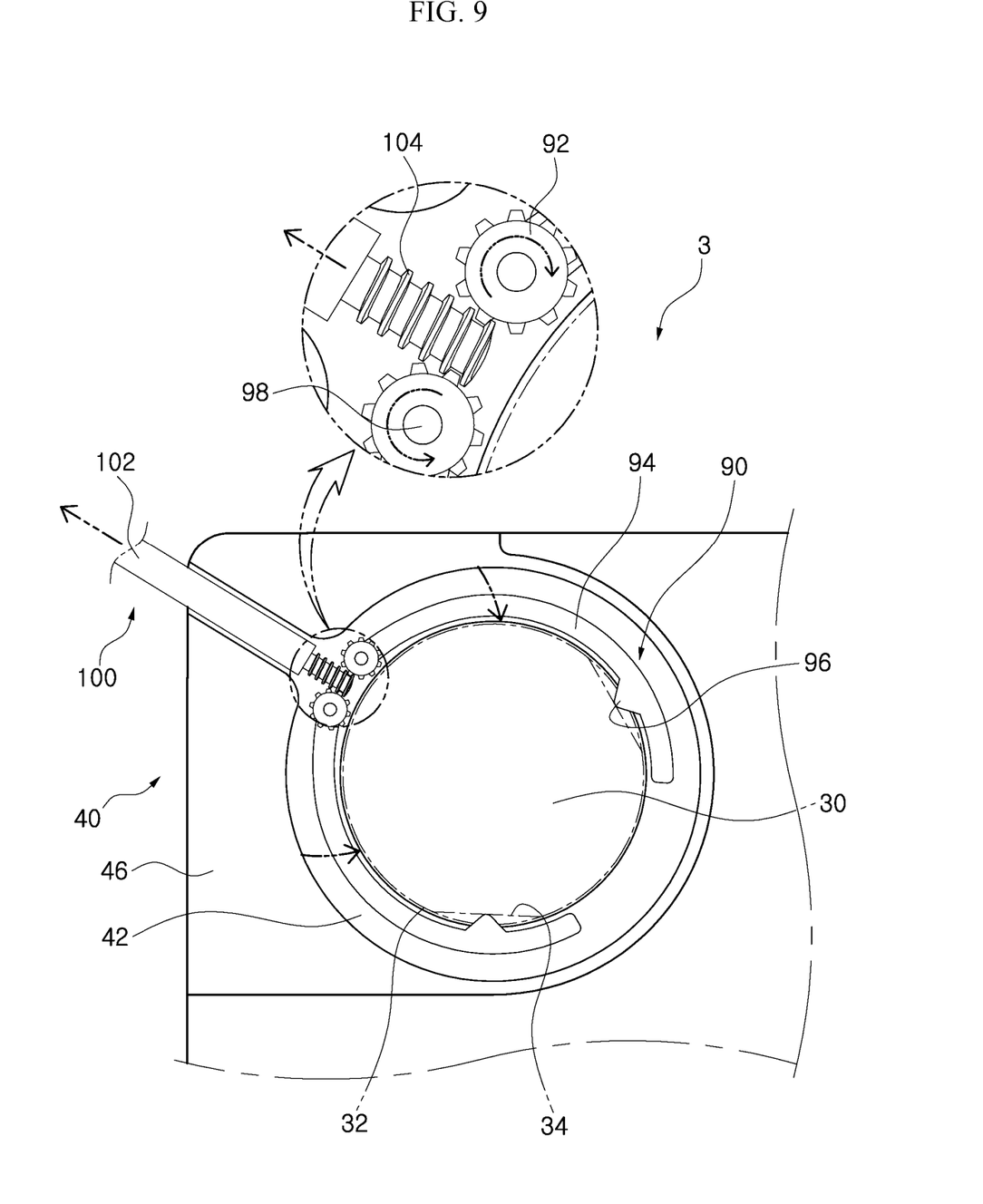
FIG. 9 is a view illustrating a state in which a locking part restricts movement of an operation part according to a third embodiment of the present invention.
Figure 10:
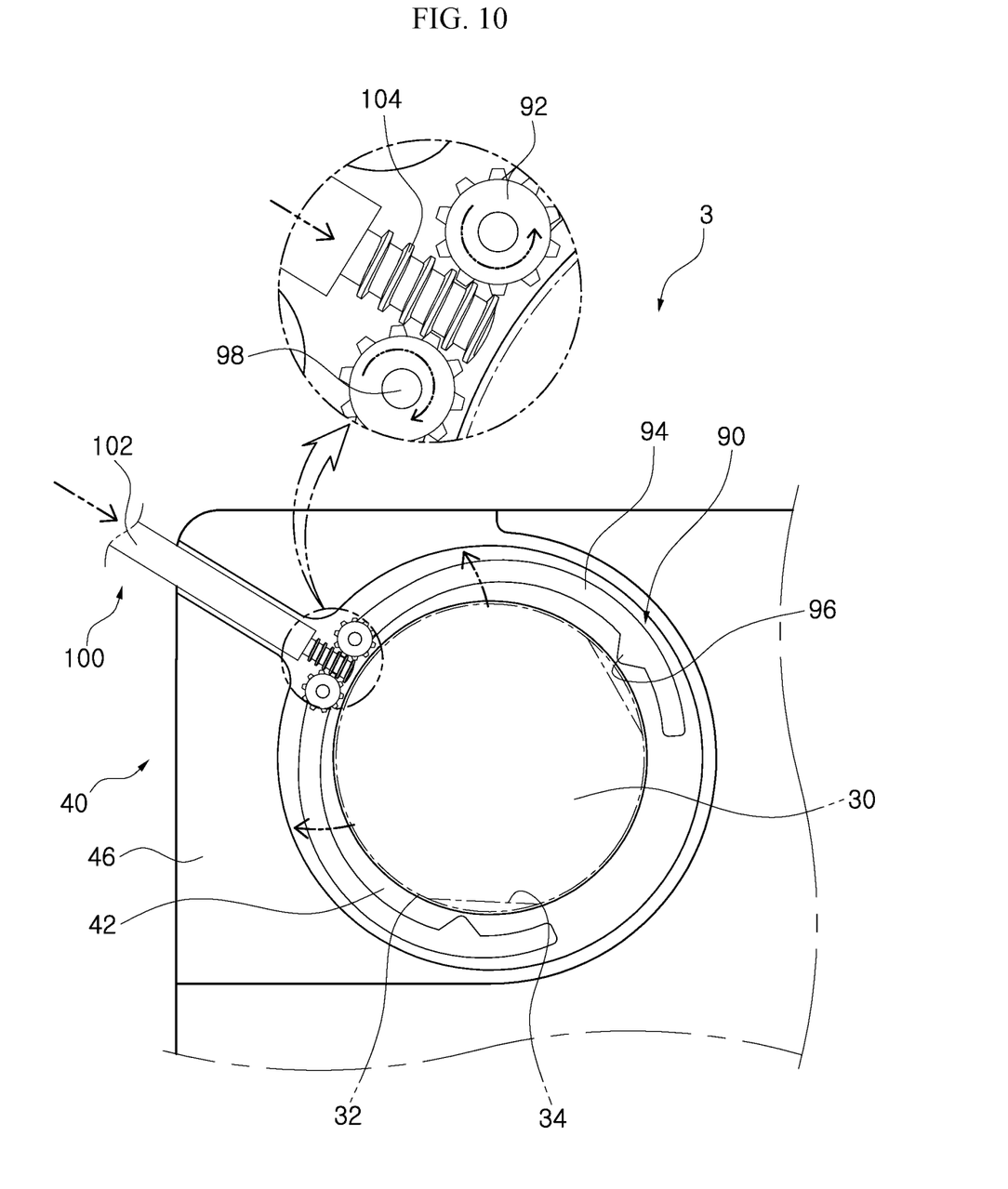
FIG. 10 is a view illustrating a state in which the locking part is rotated and the operation part is unlocked according to the third embodiment of the present invention.

FIG. 9 is a view illustrating a state in which a locking part restricts movement of an operation part according to the third embodiment of the present invention, and FIG. 10 is a view illustrating a state in which the locking part is rotated and the operation part is unlocked according to the third embodiment of the present invention.

A transmission gear part 100 according to the third embodiment of the present invention includes a third transmission gear body 102 which is located above the frame part 40 and moves in a linear direction, and a movement gear part 104 that forms a helical gear engaged with a locking part 90 outside the third transmission gear body 102.

The third transmission gear body 102 has a cylindrical shape or a rod shape and is installed to be linearly movable along a passage formed by the guide portion 46 of the frame part 40.

The locking part 90 may be changed in various shapes within the technical spirit of being located on both sides of the drive gear part 86 and rotating toward the operation part 30 or rotating in a direction away from the operation part 30 by the rotation of the third transmission gear body 102.

The locking part 90 according to the third embodiment of the present invention includes a third rotation gear part 92 that is engaged with the movement gear part 104, is rotatably installed in the frame part 40, and is rotated together with the movement gear part 104, a third extension member 94 that extends from the third rotation gear part 92 and is installed in a shape surrounding the side surface of the operation part 30, and a third restraint part 96 that protrudes from the third extension member 94 and is caught by the restraint groove parts 34 provided in the side surfaces of the operation part 30.

Since a third hinge pin 98 passes through the third rotation gear part 92 and is then connected to the frame part 40, the third rotation gear part 92 rotates about the third hinge pin 98.

In the operating device 3 according to the third embodiment of the present invention, when the transmission gear part 100 is moved in a direction away from the operation part 30, the locking part 90 engaged with the transmission gear part 100 is rotated in a direction toward the operation part 30. Further, the third restraint part 96 is inserted into the restraint groove parts 34 of the operation part 30 to restrain the movement of the operation part 30.

Alternatively, when the transmission gear part is moved in a direction away from the operation part 30, the locking part 90 engaged with the transmission gear part 100 is rotated in a direction away from the operation part 30. Further, since the restraint groove parts 34 of the operation part 30 and the third restraint part 96 are spaced apart from each other, the restraint of the operation part 30 is released.

Meanwhile, in the first, second, and third embodiments, an example in which the two locking parts 50, 70, or 90 are installed has been described. However, this is merely an example, and the purpose of embodiments of the present invention can be sufficiently achieved even when one locking part 50, 70, or 90 is installed.

Further, although not illustrated, it is obvious that a separate drive device is additionally installed in the transmission gear parts 60, 80, and 100, and the installation positions of the transmission gear parts 60, 80, and 100 may also be variously implemented.

As described above, according to embodiments of the present invention, the locking parts 50, 70, and 90 are rotated by the rotation or movement of the transmission gear parts 60, 80, and 100 to restraint the movement of the operation part 30 or easily release the restraint of the operation part 30, and thus maintenance costs can be reduced and working time can be shortened. Further, since only the operation part 30 may be separated from the glass part 10 and repaired or may be replaced, an operation of moving the glass part 10 together with the operation part 30 is omitted, and thus maintenance costs and work time for the operation part 30 can be reduced.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An operating device comprising:
    an operation part inserted into an insertion hole part of a glass part;
    a frame part installed at a position facing the operation part with the glass part interposed therebetween;
    a locking part that is rotatably installed in the frame part and configured to restrain movement of the operation part by rotation; and
    a transmission gear part that is engaged with a gear provided in the locking part and configured to rotate the locking part by being moved or rotated by an external force.

2. The operating device of claim 1, wherein the frame part includes:

a base member having a plate shape, located below the glass part, and having an inner hole part at a position facing the insertion hole part; and a guide part protruding from the base member and installed in a shape surrounding an outer side of the locking part.

3. The operating device of claim 1, wherein the locking part is located on each of two sides of the transmission gear part and configured to rotate toward the operation part or rotates in a direction away from the operation part by linear movement of the transmission gear part.

4. The operating device of claim 3, wherein the locking part includes:

a first rotation gear part that is engaged with a gear of the transmission gear part, is rotatably installed in the frame part, and is configured to rotate by the movement of the transmission gear part;

a first extension member that extends from the first rotation gear part and is installed in a shape surrounding a side surface of the operation part; and a first restraint part that protrudes from the first extension member and is caught by a restraint groove part provided in the side surface of the operation part.

5. The operating device of claim 4, wherein the first rotation gear part includes:

a rotation gear body rotatably installed in the frame part; and an outer gear that forms a gear outside the rotation gear body and is engaged with the transmission gear part.

6. The operating device of claim 1, wherein the transmission gear part includes:

a first transmission gear body that is installed to be linearly movable along the frame part and is installed at a position facing the locking part; and a spur gear portion that forms gears engaged with the locking part on both sides of the first transmission gear body.

7. The operating device of claim 1, wherein the transmission gear part includes:

a second transmission gear body that is rotatably installed above the frame part and has one side installed at a position facing the locking part; and a drive gear part that forms a helical gear engaged with the locking part outside the second transmission gear body.

8. The operating device of claim 7, wherein the locking part is located on each of two sides of the drive gear part and configured to rotate toward the operation part or rotate in a direction away from the operation part by rotation of the second transmission gear body.

9. The operating device of claim 8, wherein the locking part includes:

a second rotation gear part that is engaged with the drive gear part, is rotatably installed in the frame part, and is configured to rotate together with the drive gear part;

a second extension member that extends from the second rotation gear part and is installed in a shape surrounding a side surface of the operation part; and a second restraint part that protrudes from the second extension member and is caught by a restraint groove part provided in the side surface of the operation part.

\* \* \* \* \*